(12) United States Patent
Hueges et al.

(10) Patent No.: US 6,666,106 B1
(45) Date of Patent: Dec. 23, 2003

(54) ACCELERATOR PEDAL MODULE

(75) Inventors: Sandra Hueges, Buehlertal (DE); Sven Wolfgarten, Offenburg (DE); Mario Huesges, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/830,154

(22) PCT Filed: Aug. 18, 2000

(86) PCT No.: PCT/DE00/02831
§ 371 (c)(1),
(2), (4) Date: Oct. 22, 2001

(87) PCT Pub. No.: WO01/14162
PCT Pub. Date: Mar. 1, 2001

(30) Foreign Application Priority Data

Aug. 21, 1999 (DE) .......................... 199 39 810

(51) Int. Cl.⁷ ................................. G05G 1/14
(52) U.S. Cl. ........................... 74/514; 74/513
(58) Field of Search ...................... 74/512, 513, 514, 74/560

(56) References Cited

U.S. PATENT DOCUMENTS

| | | | | | |
|---|---|---|---|---|---|
| 4,087,776 | A | * | 5/1978 | Donato ...................... | 338/198 |
| 4,094,281 | A | * | 6/1978 | Kittler ....................... | 123/396 |
| 4,130,027 | A | * | 12/1978 | Leighton ..................... | 74/512 |
| 4,161,341 | A | * | 7/1979 | Reinecke et al. ............. | 303/52 |
| 5,865,068 | A | * | 2/1999 | Huntley ...................... | 74/513 |
| 5,934,152 | A | * | 8/1999 | Aschoff et al. ............... | 74/513 |
| 6,023,995 | A | * | 2/2000 | Riggle ........................ | 74/560 |

FOREIGN PATENT DOCUMENTS

DE     19505374 A1  *  8/1996  ........... B60K/26/02

\* cited by examiner

*Primary Examiner*—David Fenstermacher
(74) *Attorney, Agent, or Firm*—Ronald E. Greigg

(57) ABSTRACT

Disclosed in an accelerator pedal module in which a two-point calibration is performed, so that the idle travel distances are substantially shorter than could be chosen in the previously known accelerator pedal module. In particular, the sensor may first be calibrated in a so-called kick-down angle position, and the position of repose of the pedal lever then be set via an adjusting screw. The accelerator pedal module is intended for controlling the power of a driving machine of a motor vehicle.

20 Claims, 3 Drawing Sheets

ACCELERATOR PEDAL MODULE

CROSS-REFERENCE TO RELATED APPLICATIONS

This application is a 35 USC 371 application of PCT/DE 00/02831 filed on Aug. 18, 2000.

BACKGROUND OF THE INVENTION

1. Field of the Invention

The invention is directed to an accelerator pedal module more particularly to an accelerator pedal module for a motor vehicle.

2. Description of the Prior Art

For controlling the power of a driving engine or motor of a motor vehicle, the demands of the motor vehicle driver are transmitted to the driving machine from a pedal lever, disposed within range of the motor vehicle driver, by means of electric lines and via a controller. To that end, a sensor is provided that measures the position of the pedal lever. Measured values from the sensor, after suitable processing, are transmitted to the driving machine by the controller. A kick-down mechanism and an electric switch are often provided as well.

The sensor of the accelerator pedal module is intended, at a certain position of the pedal lever, to furnish an electrical signal at a precisely predetermined level. To that end, the sensor is adapted in a certain position of the pedal lever. In the accelerator pedal module shown in International Patent Disclosure WO97/12781 and in German Patent Disclosure DE 195 36 606 A1, this is done by rotating the sensor housing, in a certain position of the pedal lever, far enough that the electrical signal output by the sensor is located within a predetermined, narrow tolerance band. Upon an actuation of the pedal lever, the electrical signal output by the sensor then changes, so that the controller can detect the position of the pedal lever at that time.

Upon an actuation of the pedal lever between the position of repose of the pedal lever and the end position of the pedal lever, there is a so-called kick-down angle position, in which the restoring force exerted on the pedal lever rises abruptly. The kick-down angle position is located shortly before the end position of the pedal lever. An electric switch is provided on the accelerator pedal module. The electric switch typically serves to switch over a gear of the motor vehicle. The electric switch is switched over by the pedal lever whenever the pedal lever is located between the kick-down angle position and the end position.

Because the slope of the electrical signal output by the sensor is unavoidably affected by tolerances as a function of the angle position of the pedal lever, and because the switching point of the electric switch is also not entirely free of tolerance, and since furthermore the mechanism of the accelerator pedal module has tolerances with regard to the attainable angle positions, the switching path between the kick-down angle position and the angle position, at which the electric switch switches over, must be relatively long, in the known accelerator pedal module. The kick-down switching path between the kick-down angle position and the end position of the pedal lever is also fairly long in the known accelerator pedal module, for the tolerance reasons given. Another disadvantage is that because of tolerances, the fact that the electrical signal of the sensor upon reaching the kick-down angle position is relatively widely scattered must be accepted into the bargain.

As a result, the paths for actuating the pedal lever must be kept relatively long overall, and the scattering of the electrical signal of the sensor in the kick-down angle position must be taken into account by suitable design of the electric controller, for instance by means of a suitable control unit.

SUMMARY OF THE INVENTION

The accelerator pedal module embodied according to the invention has the advantage over the prior art that, largely independently of production-dictated tolerances in the electrical signal of the sensor, a very precise electrical signal of the sensor can be attained that is dependent on the particular position of the pedal lever at the time. In particular, it can be attained that in both the position of repose of the pedal lever and the kick-down angle position of the pedal lever, the electrical signal of the sensor is within very close tolerances. A further advantage is that the switching path between the kick-down angle position and the switchover of the electric switch can be kept desirably quite short, and the pivot angle between the kick-down angleposition of the pedal lever and the end position of the pedal lever can also be kept fairly short. As a result, the advantage is obtained that the driver operating the pedal lever has the feeling of precise control of the power of the driving machine between the position of repose of the pedal lever and the kick-down angle position of the pedal lever, and the switching path and the pivot angle between the kick-down angle position and the end position of the pedal lever can be kept fairly short. A long switching path and a long pivot angle between the kick-down angle position and the end position would in fact be perceived as a fairly unpleasant idle travel by the driver. Since only short idle travel distances for the pedal lever overall are required, the advantage is obtained that the accelerator pedal module can be made relatively small in size overall, and that the available installation space in the passenger compartment for actuating the pedal lever is fairly small.

By the provisions recited in the dependent claims, advantageous refinements of and improvements to the accelerator pedal module defined by the main claim are possible.

BRIEF DESCRIPTION OF THE DRAWINGS

The foregoing and other features of the invention will be apparent from the detailed description contained below, taken with the drawings, in which.

DESCRIPTION OF THE PREFERRED EMBODIMENTS

The accelerator pedal module embodied according to the invention can be used to control various driving machines. By way of example, the driving machine is an Otto engine, whose throttle valve is adjusted with a control motor. In that case, the accelerator pedal module is used to output electrical signals, which are delivered to the control motor that adjusts the throttle valve. However, by way of example, the driving machine can also be a Diesel engine or an electric motor, and in these cases as well, electrical signals originate at the accelerator pedal module and, suitably reshaped, control the power of the driving machine.

The accelerator pedal module is preferably secured to a vehicle part of the motor vehicle directly within action range of the motor vehicle driver. The pedal lever of the accelerator pedal module is often also called a gas pedal.

Figure 1:
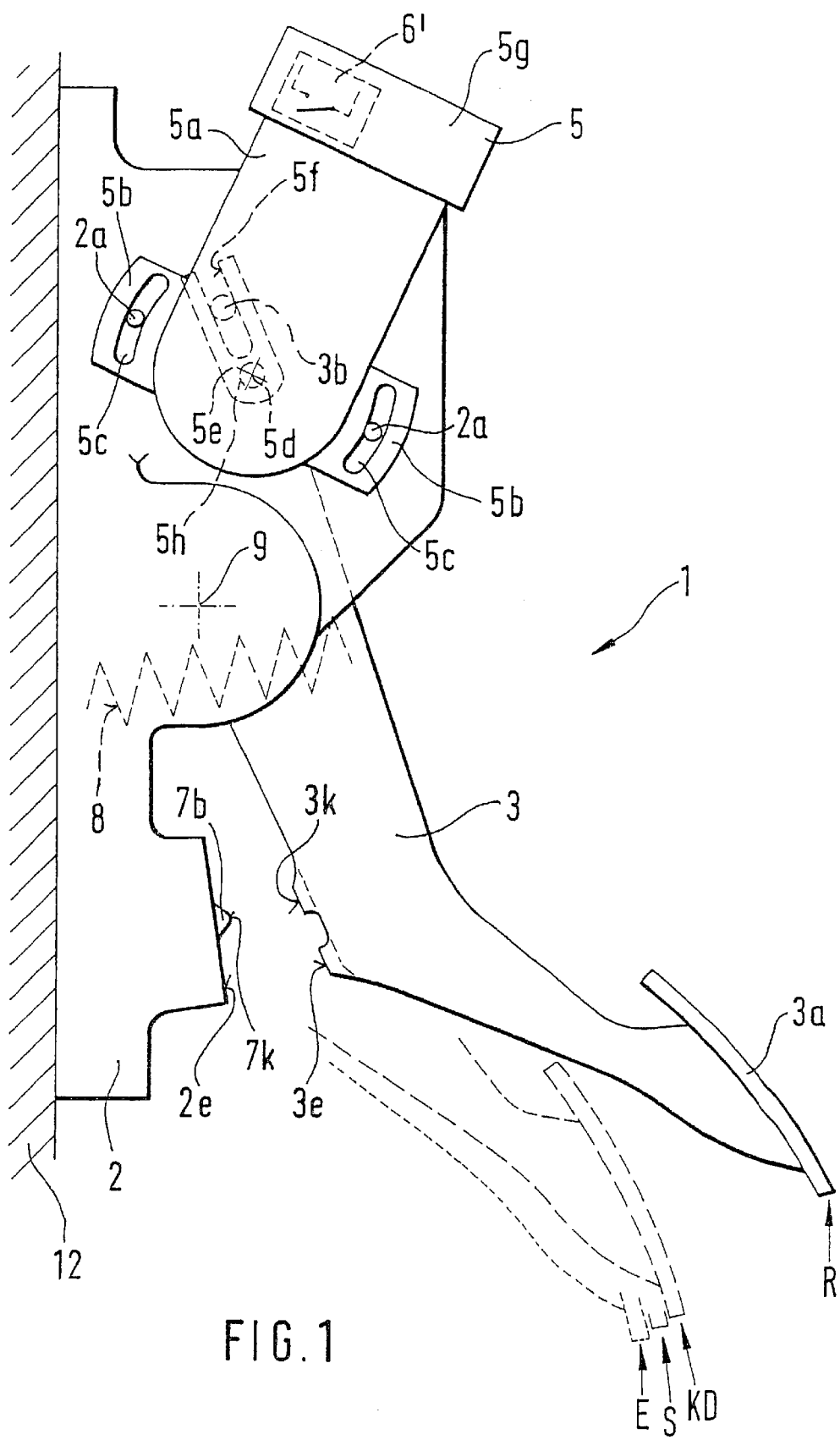
FIG. 1 is a side view of a first exemplary embodiment of an accelerator pedal module.
Figure 2:
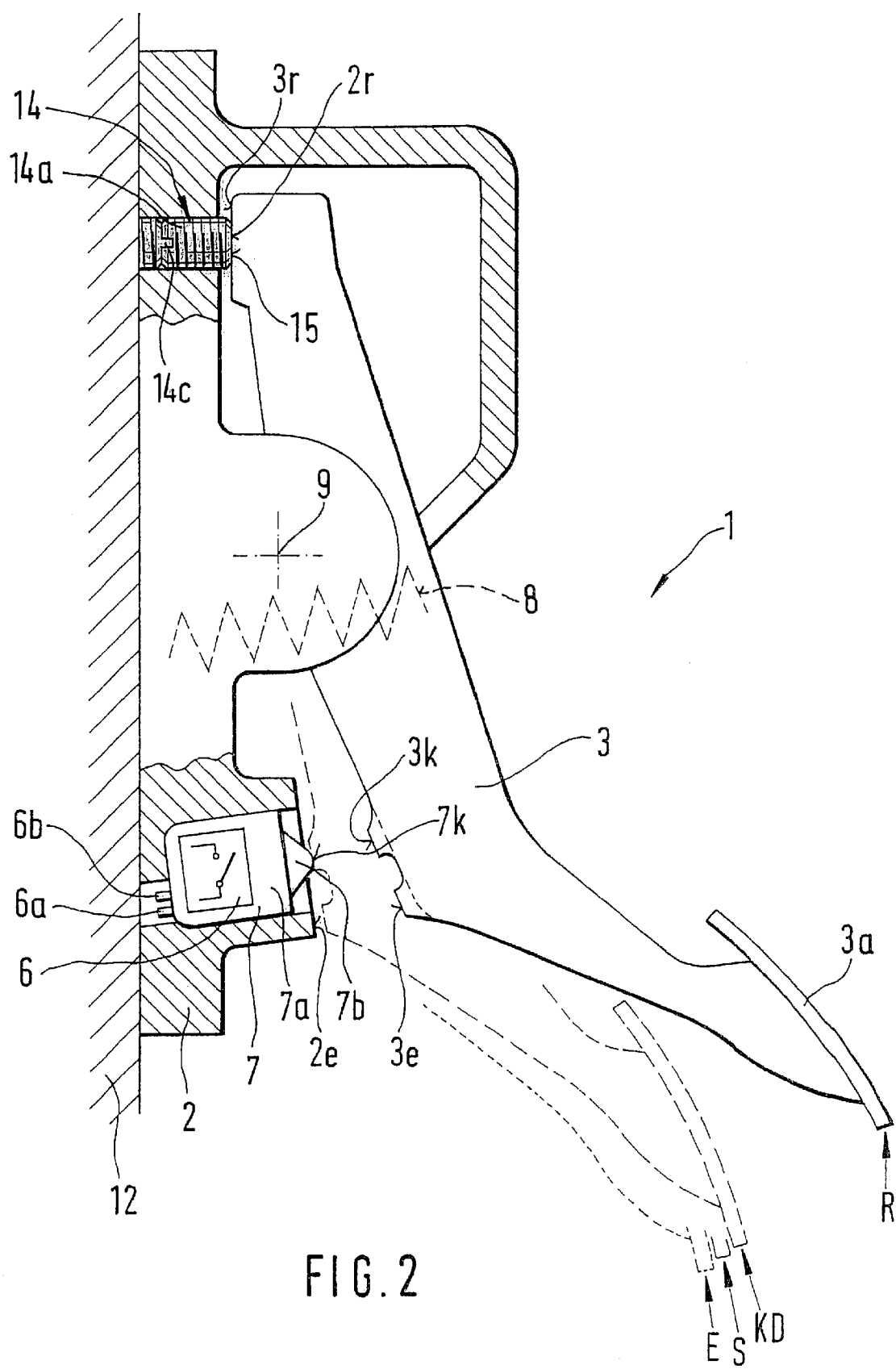
FIG. 2, partly in section, is a side view of the first exemplary embodiment with the sensor removed.

FIGS. 1 and 2 show a side view of a preferably selected, especially advantageous exemplary embodiment; in FIG. 2, for the sake of greater simplicity, the sensor has been omitted, and both the retaining structure that serves as a housing and the pedal lever of the accelerator pedal module are shown partly in section.

In all the drawings, identical or identically functioning parts are identified by the same reference numerals. Unless otherwise noted or shown in the drawings, what is said and shown in conjunction with one of the drawing figures applies to the other exemplary embodiments as well. Unless otherwise stated in the explanation, details of the various exemplary embodiments can be combined with one another.

FIGS. 1 and 2 show an accelerator pedal module 1. The accelerator pedal module 1 includes a retaining structure 2, a pedal lever 3, a sensor 5, an electric switch 6, a kick-down mechanism 7, a restoring spring assembly 8, and a pivot bearing 9.

The retaining structure 2 is preferably secured directly in the range of the foot of a motor vehicle driver to a vehicle part 12 of a motor vehicle, shown symbolically by shading in the drawings. The pedal lever 3 is preferably actuated directly by the driver's foot. However, it is also possible to connect a separate gas pedal pivotably to the pedal lever 3 via a simple rod linkage.

The retaining structure 2 carries the pedal lever 3. Via the pivot bearing 9, the pedal lever 3 is supported pivotably relative to the retaining structure 2. The sensor 5 senses the position of the pedal lever 3 at any given time and furnishes an electrical signal, corresponding to the position of the pedal lever 3, to a controller, not shown, via electric lines, also not shown in drawings.

The pedal lever 3 is adjustable between position of repose R and an end position E. Between the position of repose R and the end position E, there is a kick-down angle position KD. The pedal lever 3 reaches the kick-down angle position KD shortly before it reaches its end position E. Between the kick-down angle position KD and the end position E, there is also a particular, definable switching position S.

The electric switch 6 shown symbolically in FIG. 2 is integrated with the kick-down mechanism 7. In the structurally definable switching position S of the pedal lever 3, the electric switch 6 generates a signal to the controller, not shown, via the terminal pins 6a and 6b leading out of the kick-down mechanism 7 and via an electric line, not shown. By way of example, the switch 6 is a so-called opener or a so-called closer.

If the pedal lever 3 is not actuated, then the restoring spring assembly 8 puts the pedal lever 3 in the position of repose R. If sufficiently great force is exerted on a pedal plate 3a provided at the end of the pedal lever 3, then the pedal lever 3 can be adjusted counter to the restoring force of the restoring spring assembly 8 as far as the end position E.

The drawings show the pedal lever 3 in its position of repose R in solid lines. Part of the pedal lever 3 is also shown in dashed lines in the kick-down angle position KD; short dashed lines also indicate the end position E of the pedal lever 3, and the lower end of the pedal plate 3a is also furthermore shown symbolically, while the pedal lever 3 is in the switching position S. For the sake of greater simplicity, the pedal lever 3 is shown only in part in the kick-down angle position KD, the switching position S, and the end position E. An arrow marked R points to the lower end, in the position of repose R, of the pedal plate 3a; an arrow marked KD points to the lower end, in the kick-down angle position KD, of the pedal plate 3a; an arrow marked S points to the lower end, in the switching position S, of the pedal plate 3a; and an arrow marked E points to the lower end, in the end position E, of the pedal plate 3a.

The sensor 5 is flanged to the retaining structure 2, which acts as a housing or as a bearing block. The sensor 5 has a sensor housing 5a, onto which two laterally protruding flanges 5b are formed. One oblong slot 5c is provided in each of the flanges 5b. The sensor 5 is built onto the retaining structure 2 in such a way that the sensor 5 is rotatable about a sensor lever pivot axis 5d relative to the retaining structure 2. To that end, a cylindrical protrusion is formed, for instance onto the sensor housing 5a, concentrically to the sensor lever pivot axis 5d, and the protrusion engages a cylindrical bore provided in the retaining structure 2. The sensor lever pivot axis 5d extends perpendicular to the plane of the drawing in FIGS. 1 and 2; in FIG. 1, the sensor lever pivot axis 5d is indicated in symbolic form as an intersection point of two short lines perpendicular to one another. The sensor 5 has a sensor shaft 5h and a sensor lever 5e. The sensor shaft 5h extends concentrically to the sensor lever pivot axis 5d. The sensor shaft 5h penetrates the sensor housing 5a on the side of the sensor housing 5a that is remote from the side that is visible in FIG. 1. The sensor level 5e is secured in a manner fixed against relative rotation on the end of the sensor shaft 5h toward the pedal lever 3 and protruding out of the sensor housing 5a.

The sensor 5 is flanged to the retaining structure 2, which acts as a housing or as a bearing block. The sensor 5 has a sensor housing 5a, onto which two laterally protruding flanges 5b are formed. One oblong slot 5c is provided in each of the flanges 5b. The sensor 5 is built onto the retaining structure 2 in such a way that the sensor 5 is rotatable about a sensor lever pivot axis 5d relative to the retaining structure 2. To that end, a cylindrical protrusion is formed, for instance onto the sensor housing 5a, concentrically to the sensor lever pivot axis 5d, and the protrusion engages a cylindrical bore provided in the retaining structure 2. The sensor lever pivot axis 5d extends perpendicular to the plane of the drawing in FIGS. 1 and 2; in FIG. 1, the sensor lever pivot axis 5d is indicated in symbolic form as an intersection point of two short lines perpendicular to one another. The sensor 5 has a sensor shaft 5h and a sensor lever 5e. The sensor shaft 5h extends concentrically to the sensor lever pivot axis 5d. The sensor shaft 5h penetrates the sensor housing 5a on the side of the sensor housing 5a that is remote from the side that is visible in FIG. 1. The sensor lever 5e is secured in a manner fixed against relative rotation on the end of the sensor shaft 5h toward the pedal lever 3 and protruding out of the sensor housing 5a.

Upon an actuation of the pedal lever 3, the pin 3b of the pedal lever 3 moves about the pivot axis of the pivot bearing 9. Since the pedal lever 3, via the pin 3b, is in engagement with the sensor lever 5e of the sensor 5, an actuation of the pedal lever 3 leads to a correspondingly stepped-up pivoting motion of the sensor lever 5e about the sensor lever pivot axis 5d, which in turn causes a corresponding change in the electrical signal of the sensor 5.

The kick-down mechanism 7 has a housing 7a. The housing 7a is built into the retaining structure 2. Inside the housing 7a, there is an axially displaceable pin 7b that can be pressed in resiliently. On the face end of the pin 7b toward the pedal lever 3, a kick-down stop 7k is provided. There is a counterpart stop 3k on the pedal lever 3.

On the retaining structure 2, there is an end stop 2e, and there is a counterpart end stop 3e on the pedal lever 3. Upon actuation of the pedal lever 3 until it reaches the end position E, the counterpart end stop 3e of the pedal lever 3 comes to rest on the end stop 2e of the retaining structure 2. As a result, the maximum actuatable pivot angle of the pedal lever 3 is limited, and the end position E is defined.

Upon an actuation of the pedal lever 3 beginning at the position of repose R, the counterpart stop 3k provided on the pedal lever 3 comes to rest, in an intermediate position, on the kick-down stop 7k. The angle position at which the counterpart stop 3k comes to rest on the kick-down stop 7k is called the kick-down angle position KD. If the pedal lever 3 is actuated farther, past the kick-down angle position KD, then the resiliently prestressed pin 7b is pressed into the housing 7a. As a result, when the kick-down angle position KD is exceeded, the restoring force acting on the pedal lever 3 rises abruptly.

While the sensor lever 5e is in engagement with the pedal lever 3 via the pin 3b, the entire sensor housing 5a can be pivoted about the sensor lever pivot axis 5d. The result is a rotational guidance of the sensor housing 5a relative to the retaining structure 2, via the protrusion that is formed onto the sensor housing 5a and engages the cylindrical bore provided in the retaining structure 2. By means of rotating the sensor housing 5a, calibration of the sensor 5 can be done. The sensor 5 can be rotated about the sensor lever pivot axis 5d so far that the desired, predetermined electrical signal corresponding to the position of the pedal lever 3 at the time is output at the plug connection 5g of the sensor 5.

Two plastic pins 2a are formed onto the retaining structure 2. The pins 2a protrude through the oblong slots 5c of the sensor 5. The oblong slots 5c extend concentrically to the sensor lever pivot axis 5d. For calibration of the sensor 5, the sensor housing 5a can be rotated about the sensor lever pivot axis 5d so far that the pins 2a of the retaining structure 2 abut the ends of the oblong slots 5c of the sensor 5. This calibration takes place while the pedal lever 3 is in a first angle position. In the first angle position, the sensor 5 is calibrated, by rotation of the sensor housing 5a, in such a way that the signal output by the sensor 5 corresponds to a desired, predeterminable, first electrical setting signal.

It is especially proposed that the kick-down angle position KD of the pedal lever 3 be provided as the first angle position for setting the first electrical setting signal. As a result, especially low tolerances are obtained overall. However, it is also possible to provide the end position E of the pedal lever 3 as the first angle position for setting the first electrical setting signal.

After the calibration of the first electrical setting signal of the sensor 5, the pins 2a are deformed, by axial pressure and optionally by supplying heat, far enough that a permanent, immovable clamping connection is created between the pins 2a of the retaining structure 2 and the flanges 5b of the sensor 5. Even after a long time in operation, this assures a fixed association between the position of the pedal lever 3 and the electrical signal output by the sensor 5.

On the retaining structure 2, there is a repose stop 2r. A counterpart repose stop 3r is provided on the pedal lever 3. The repose stop 2r forms an adjustable stop 15. An adjusting element 14 is provided on the retaining structure 2. To keep the production cost low, the adjusting element 14 is an adjusting screw 14a screwed into the retaining structure 2. The repose stop 2r that forms the adjustable stop 15 in this exemplary embodiment is located on the end of the adjusting screw 14a toward the counterpart repose stop 3r. As FIGS. 1 and 2 show, the repose stop 2r and thus the adjustable stop 15 of the adjusting element 14 are assigned, via the retaining structure 2, to the vehicle part 12 of the motor vehicle. Correspondingly, the counterpart repose stop 3r is assigned to the pivotable pedal lever 3.

Beginning at the position of repose R, the pedal lever 3 passes through the kick-down angle position KD and then the switching position S to reach the end position E. For reasons of comfort and because of the required installation space, the pivot angle between the kick-down angle position KD and the end position E should be as small as possible, and assurance should also be provided that the electrically usable range of the sensor 5 is in fact also fully exploited. Since the pivot angle between the kick-down angle position KD and the end position E, and thus also the pivot angle between the switching position S and the end position E, should be quite small, it is proposed that a calibration be performed in two positions of the pedal lever 3. Besides the calibration in the first angle position to the first electrical setting signal, the accelerator pedal module 1 is also calibrated in a second angle position of the pedal lever 3 to a desired, predetermined, second electrical setting signal.

The setting of the predeterminable first electrical setting signal is preferably done whenever the pedal lever 3 is in its kick-down angle position KD. During the setting of the first electrical setting signal, the pedal lever 3 is acted upon by a force that suffices to keep the counterpart stop 3k of the pedal lever 3 in contact with the kick-down stop 7k, but without pressing the pin 7b inward. To set the first electrical setting signal, while the pedal lever 3 is in the kick-down angle position KD, the sensor housing 5a is rotated relative to the retaining structure 2 far enough that the desired first electrical setting signal is output by the sensor 5 at the plug connection 5g. Next, the sensor 5 is permanently fixed relative to the retaining structure 2 with the aid of the pins 2a, while the pedal lever 3 is held in the is kick-down angle position KD.

In the unloaded state, the restoring spring assembly 8 actuates the pedal lever 3 to its position of repose R. During the setting of the desired, predetermined, second electrical setting signal, the pedal plate 3a is not loaded. As a result, the pedal lever 3 is in its position of repose R, and the counterpart repose stop 3r rests on the adjustable stop 15. While the pedal lever 3 is in the position of repose R, the adjusting screw 14a is rotated at the wrench face 14c. By rotation at the adjusting screw 14a, the adjustable stop 15 is adjusted, and as a result the pedal lever 3 is pivoted somewhat. This causes the electrical signal output by the sensor 5 to change, while the pedal lever 3 is in the non-actuated position of repose R. Rotation is performed at the adjusting screw 14a of the adjusting element 14 long enough that the sensor 5 outputs the desired, predeterminable, second electrical setting signal. Thus by rotation of the adjusting screw 14a acting as an adjusting element 14, the desired second electrical setting signal is calibrated.

The wrench face 14c of the adjusting screw 14a is accessible from the side of the retaining structure 2 oriented toward the vehicle part 12. This makes it possible for the adjusting element 14 to be set even after the accelerator pedal module 1 has been completely assembled. Since the wrench face 14c of the adjusting screw 14a is no longer accessible once the accelerator pedal module 1 has been mounted on the vehicle part 12, unintended adjustment of the adjusting element 14 is prevented with certainty.

As the preferably selected exemplary embodiment described in conjunction with the drawings shows, it is proposed that a first electrical setting signal and in addition a predeterminable second electrical setting signal be calibrated. It is especially proposed that the first electrical setting signal be set while the pedal lever 3 is in its actuated kick-down angle position KD; however, it is also possible to set the first electrical setting signal while the pedal lever 3 is in its fully actuated end position E. It is further proposed that the predeterminable second electrical setting signal be set while the pedal lever 3 is in the unactuated position of repose R. The double calibration can be done especially simply and without major engineering effort or expense by providing that the first electrical setting signal is effected by pivoting the sensor 5 about the sensor lever pivot axis 5d, and the setting of the second electrical setting signal is done by calibrating the angular position of the pedal lever 3 in the position of repose R such that in the position of repose R, the predeterminable electrical setting signal occurs, and this second setting takes place by way of the adjustable stop 15 provided between the pedal lever 3 and the retaining structure 2.

In the preferably selected exemplary embodiment, the electric switch 6 is integrated with the kick-down mechanism 7. Instead of the electric switch 6 in the kick-down mechanism 7, or in addition to the electric switch 6 in the kick-down mechanism 7, an electric switch 6' can selectively also be provided inside the sensor 5. The alternative switch 6' is shown symbolically by dashed lines in FIG. 1. The switch 6' in the sensor 5 is constructed such that when the pedal lever 3 exceeds the switching position S, the electric switch 6' provided in the sensor 5 switches over.

Depending on the type of motor vehicle and in particular on the embodiment of the electric controller, it is possible to dispense with both the switch 6 and the switch 6'. The electric controller can also be constructed such that when the pedal lever 3 is in the switching position S, the downstream controller sends a corresponding electrical switching signal to a component of the motor vehicle that is to be switched, doing so on the basis of electrical values output by the sensor 5 and ascertained for instance via the potentiometer built into the sensor 5.

Figure 3:
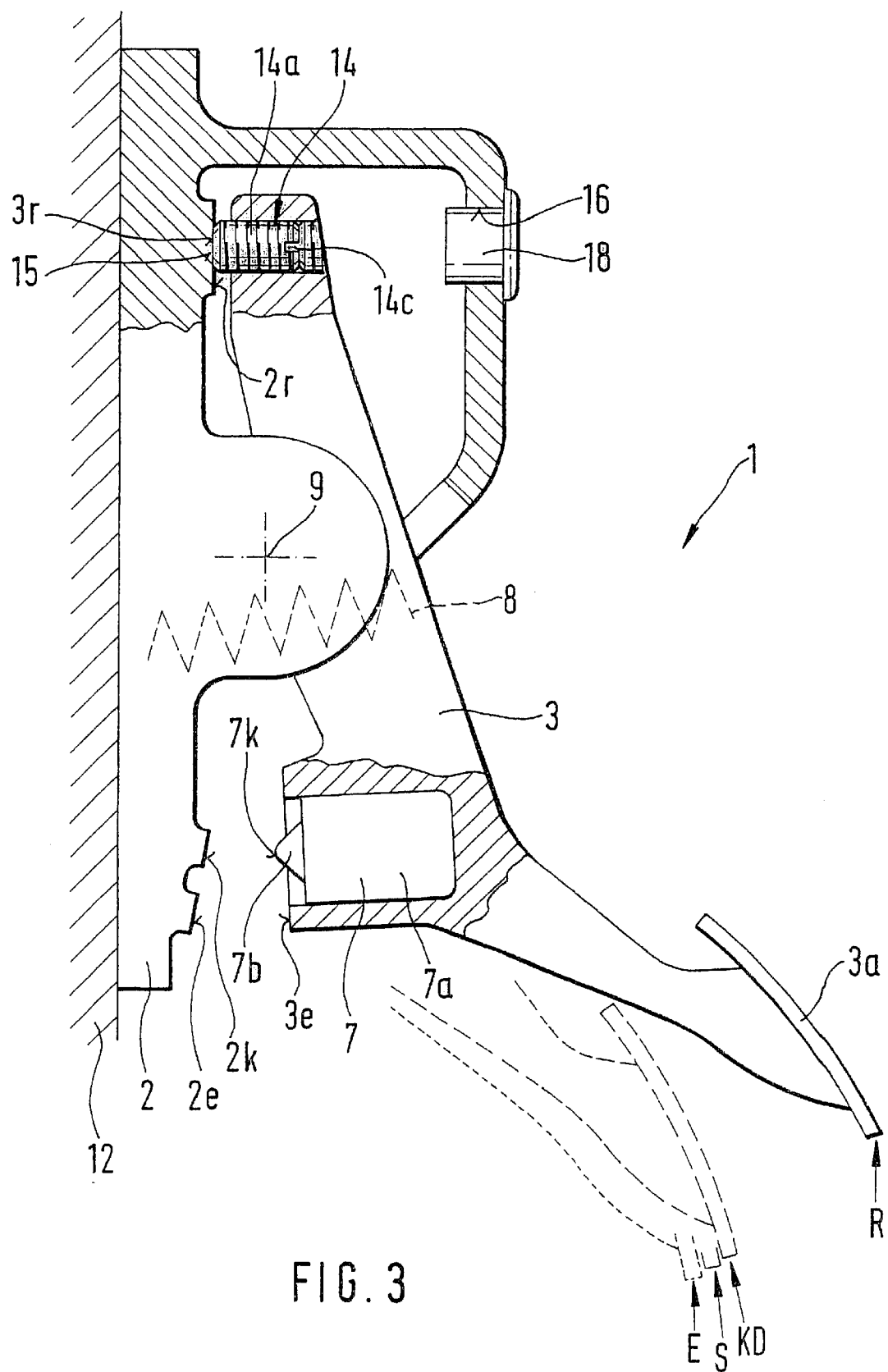
FIG. 3, partly in section, is a side view with the sensor removed from a further exemplary embodiment of the accelerator pedal module.

FIG. 3 shows a further preferably selected, especially advantageous exemplary embodiment.

Since in the second exemplary embodiment the sensor 5 and the pivotable connection of the sensor 5 to the retaining structure 2 and to the pedal lever 3 are designed identically to the first exemplary embodiment, the sensor 5 has not been shown in FIG. 3 for the sake of greater simplicity in the second exemplary embodiment, and parts of the retaining structure 2 and of the pedal lever 3 are also shown in section for the sake of greater simplicity.

In the exemplary embodiment shown in FIG. 3, the housing 7a of the kick-down mechanism 7 is built into the pedal lever 3. Thus in this exemplary embodiment, the kick-down stop 7k is assigned to the pedal lever 3, and a counterpart stop 2k to the kick-down stop 7k is provided on the retaining structure 2. Upon actuation of the pedal lever 3 to the kick-down angle position KD, the kick-down stop 7k contacts the counterpart stop 2k. If the pedal lever 3 is actuated past the kick-down angle position KD, then the counterpart stop 2k presses the pin 7b into the housing 7a, until the counterpart end stop 3e rests on the end stop 2e, thereby defining both the end position E and hence the maximum pivotability of the pedal lever 3.

The adjusting screw 14a that forms the adjusting element 14 is screwed into the pedal lever 3, in the exemplary embodiment shown in FIG. 3. The repose stop 2r is located on the retaining structure 2, and the counterpart repose stop 3r is located on the face end of the adjusting screw 14a toward the repose stop 2r. In this exemplary embodiment, the counterpart repose stop 3r forms the adjustable stop 15 of the adjusting element 14. That is, in this example the adjustable stop 15 is assigned to the pedal lever 3. When the pedal lever 3 is in the position of repose R, then the counterpart repose stop 3r of the pedal lever 3 rests on the repose stop 2r of the retaining structure 2. Also in this exemplary embodiment, the setting of the second setting signal can be done in the unactuated position of repose R, by adjustment of the adjusting element 14.

An opening 16 is provided in the retaining structure 2. Through the opening 16, the adjusting screw 14a can be rotated with a wrench, via the wrench face 14c. After the calibration, the opening 6 is closed with a stopper 18.

To avoid an electrical connection line that is constantly in motion, it is proposed that in the exemplary embodiment shown in FIG. 3, no electric switch be provided in the kick-down mechanism 7, but instead, that the electric switch 6' in the sensor 5 be used, as represented symbolically by dashed lines in FIG. 1.

The accelerator pedal module 1 can also be modified, for instance in such a way that the kick-down mechanism 7 is assigned to the retaining structure 2, while the adjusting element 14 with the adjustable stop 15 is provided on the pedal lever 3. A further example of modification is possible in such a way that the kick-down mechanism 7 is built into the pedal lever 3, and the adjusting screw 14a that forms the adjusting element 14 and has the adjustable stop 15 is provided on the retaining structure 2.

The foregoing relates to preferred exemplary of embodiments of the invention, it being understood that other variants and embodiments thereof are possible within the spirit and scope of the invention, the latter being defined by the appended claims.

We claim:

1. In an accelerator pedal module for controlling the power of a driving machine of a motor vehicle, having a pedal lever (3) pivotally supported via a pivot bearing (9) which is mounted on a part of the vehicle, wherein a sensor (5) detects the angle position of the pedal lever (3) and furnishes a corresponding electrical signal to a controller and a restoring spring assembly (8) for restoring the pedal lever (3) to a position of repose (R) are provided, having a kick-down mechanism (7), wherein the pedal lever (3) can be put into a kick-down position (KD), in which the kick-down mechanism (7) generates a contrary force on the pedal lever (3) in the direction of the position of repose (R), and the electrical signal of the sensor is calibratable in one angle position of the pedal lever (3), the improvement wherein, in a first angle position of the pedal lever (3), the sensor (5) is calibratable such that the electrical signal furnished by the sensor (5) corresponds to a predeterminable first electrical setting signal, and that a second angle position of the pedal lever (3) is settable such that in the second angle position, the electrical signal furnished by the sensor (5) corresponds to a predeterminable second electrical setting signal.

2. The accelerator pedal module of claim 1, wherein the sensor (5) includes a sensor lever pivot axis (5d), and that setting of the first electrical setting signal is effected by pivoting the sensor (5) about the sensor lever pivot axis (5d).

3. The accelerator pedal module of claim 2 wherein the setting of the second electrical setting signal is effected via an adjustable stop provided between the pedal lever (3) and the retaining structure (2).

4. The accelerator pedal module of claim 3 wherein the first angle position of the pedal lever (3) is equivalent to the kick-down angle position (KD).

5. The accelerator pedal module of claim 4 wherein the second angle position of the pedal lever (3) corresponds to the position of repose (R).

6. The accelerator pedal module of claim 2 wherein the first angle position of the pedal lever (3) is equivalent to the kick-down angle position (KD).

7. The accelerator pedal module of claim 2 wherein the second angle position of the pedal lever (3) corresponds to the position of repose (R).

8. The accelerator pedal module of claim 1 wherein setting of the second electrical setting signal is effected via an adjustable stop provided between the pedal lever (3) and said vehicle part which mounts the pivot bearing.

9. The accelerator pedal module of claim 8 wherein the first angle position of the pedal lever (3) is equivalent to the kick-down angle position (KD).

10. The accelerator pedal module of claim 8 wherein the second angle position of the pedal lever (3) corresponds to the position of repose (R).

11. The accelerator pedal module of claim 1 wherein the first angle position of the pedal lever (3) is equivalent to the kick-down angle position (KD).

12. The accelerator pedal module of claim 11 wherein the second angle position of the pedal lever (3) corresponds to the position of repose (R).

13. The accelerator pedal module of claim 1, wherein the second angle position of the pedal lever (3) corresponds to the position of repose (R).

14. The accelerator pedal module of claim 13, wherein the pedal lever (3) has an adjustable stop (15), and the vehicle part (12) has a fixed stop, and in the position of repose (R), the adjustable stop (15) is in contact with the fixed stop.

15. The accelerator pedal module of claim 13, wherein an adjustable stop (15) is assigned to the vehicle part, and the pedal lever (3) in the position of repose (R) is in contact with the adjustable stop (15).

16. In an accelerator pedal module for controlling the power of a driving machine of a motor vehicle, having a pedal lever (3) pivotally supported via a pivot bearing (9) which is mounted on a part of the vehicle, wherein a sensor (5) detects the angular position of the pedal lever (3) and furnishes an electrical signal to a controller, which electrical signal corresponds to the angular position of the pedal lever, and a restoring spring assembly (8) for restoring the pedal lever (3) to a position of repose (R) are provided, the accelerator pedal module having a kick-down mechanism (7), wherein the pedal lever (3) can be put into a kick-down position (KD), in which kick-down position the kick-down mechanism (7) generates an additional force on the pedal lever (3) in the direction of restoring the pedal lever to its position of repose (R), and the electrical signal furnished by the sensor is calibratable in one angular position of the pedal lever (3), the improvement wherein, in a first angular position of the pedal lever (3), the sensor (5) is adjusted such that it provides a first electrical signal which corresponds to the first position of the pedal lever, and that a second angular position of the pedal lever (3) is settable, such that in the second angle position the electrical signal furnished by the sensor (5) corresponds to a predeterminable second electrical setting signal, wherein setting of the second electrical setting signal is effected via a stop (5) provided between the pedal lever (3) and said vehicle part which mounts the pivot bearing.

17. The accelerator pedal module of claim 16, wherein the sensor (5) includes a sensor lever pivot axis (5d), and that setting of the first electrical setting signal is effected by pivoting the sensor (5) about the sensor lever pivot axis (5d).

18. The accelerator pedal module of claim 16 wherein said stop (5) is adjustable.

19. The accelerator pedal module of claim 16 wherein the first angle position of the pedal lever (3) is equivalent to the kick-down angle position (KD).

20. The accelerator pedal module of claim 16 wherein the second angle position of the pedal lever (3) corresponds to the position of repose (R).

* * * * *

UNITED STATES PATENT AND TRADEMARK OFFICE
CERTIFICATE OF CORRECTION

PATENT NO. : 6,666,106 B1
DATED : December 23, 2003
INVENTOR(S) : Sandra Huesges et al.

It is certified that error appears in the above-identified patent and that said Letters Patent is hereby corrected as shown below:

<u>Title page,</u>
Item [75], Inventors, please correct to read as follows:
-- [75]  Inventors:   Sandra Huesges, Buehlertal (DE);
                     Sven Wolfgarten, Offenburg (DE);
                     Mario Huesges, Buehlertal (DE) --

Signed and Sealed this

Twenty-third Day of March, 2004

JON W. DUDAS
*Acting Director of the United States Patent and Trademark Office*